United States Patent
Chae et al.

(10) Patent No.: US 10,531,371 B2
(45) Date of Patent: Jan. 7, 2020

(54) METHOD AND DEVICE FOR TRANSMITTING AND RECEIVING PLURALITY OF D2D SIGNALS IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/564,696

(22) PCT Filed: Apr. 8, 2016

(86) PCT No.: PCT/KR2016/003723
§ 371 (c)(1),
(2) Date: Oct. 5, 2017

(87) PCT Pub. No.: WO2016/163814
PCT Pub. Date: Oct. 13, 2016

(65) Prior Publication Data
US 2018/0077633 A1    Mar. 15, 2018

Related U.S. Application Data

(60) Provisional application No. 62/251,088, filed on Nov. 4, 2015, provisional application No. 62/174,539, filed (Continued)

(51) Int. Cl.
*H04W 48/16* (2009.01)
*H04W 72/04* (2009.01)
(Continued)

(52) U.S. Cl.
CPC .............. *H04W 48/16* (2013.01); *H04L 5/00* (2013.01); *H04L 5/0048* (2013.01);
(Continued)

(58) Field of Classification Search
None
See application file for complete search history.

(56) References Cited

U.S. PATENT DOCUMENTS 9,706,481 B2 *   7/2017   Sartori ................... H04W 48/16
9,847,848 B2 *  12/2017   Ryu ........................... H04L 1/00
(Continued)

FOREIGN PATENT DOCUMENTS

JP    2012507974     3/2012
JP    2014220603    11/2014
(Continued)

OTHER PUBLICATIONS

PCT International Application No. PCT/KR2016/003723, Written Opinion of the International Searching Authority dated Jul. 22, 2016, 27 pages.
(Continued)

*Primary Examiner* — Hong S Cho
(74) *Attorney, Agent, or Firm* — Lee Hong Degerman Kang & Waimey

(57) ABSTRACT

A method for transmitting a discovery signal in a wireless communication system, according to an embodiment of the present invention, comprises the steps of: selecting from a resource pool n (n>0) resource units for transmitting a discovery signal; and transmitting the discovery signal by using the selected n resource units, wherein, when the n resource units are selected, the kth (0<k=<n) resource unit is selected from subframes excluding the subframes comprising from first resource unit to k−1th resource unit.

12 Claims, 12 Drawing Sheets

Related U.S. Application Data on Jun. 12, 2015, provisional application No. 62/150,234, filed on Apr. 20, 2015, provisional application No. 62/144,916, filed on Apr. 8, 2015.

(51) Int. Cl.
*H04L 5/00* (2006.01)
*H04L 5/14* (2006.01)
*H04W 48/08* (2009.01)

(52) U.S. Cl.
CPC ............. *H04L 5/0082* (2013.01); *H04L 5/14* (2013.01); *H04W 48/08* (2013.01); *H04W 72/0446* (2013.01)

(56) References Cited

U.S. PATENT DOCUMENTS

| | | | |
|---|---|---|---|
| 10,045,192 B2* | 8/2018 | Niu | H04W 72/0413 |
| 2010/0110929 A1* | 5/2010 | Li | H04B 1/7143 |
| | | | 370/254 |
| 2010/0202400 A1* | 8/2010 | Richardson | H04W 8/005 |
| | | | 370/330 |
| 2013/0109301 A1 | 5/2013 | Hakola et al. | |
| 2014/0056220 A1* | 2/2014 | Poitau | H04W 76/14 |
| | | | 370/328 |
| 2014/0269558 A1 | 9/2014 | Sartori et al. | |
| 2015/0043448 A1 | 2/2015 | Chatterjee et al. | |
| 2015/0215846 A1* | 7/2015 | Wang | H04W 72/0446 |
| | | | 370/336 |
| 2016/0014589 A1* | 1/2016 | Niu | H04W 74/02 |
| | | | 370/329 |
| 2016/0095074 A1* | 3/2016 | Park | H04W 8/005 |
| | | | 370/350 |

FOREIGN PATENT DOCUMENTS

| | | |
|---|---|---|
| KR | 1020150017682 | 2/2015 |
| WO | 2014130156 | 8/2014 |
| WO | 2014173429 | 10/2014 |
| WO | 2015020448 | 2/2015 |

OTHER PUBLICATIONS

Intel, "On remaining details of D2D discovery", 3GPP TSG RAN WG1 Meeting #79, R1-144654, Nov. 2014, 7 pages.
European Patent Office Application Serial No. 16776917.3, Search Report dated Oct. 16, 2018, 8 pages.
Potevio, "Way forward of type 1 discovery resource allocation regarding congestion and collision", 3GPP TSG RAN WG2 Meeting #85bis, R2-141378, Apr. 2014, 3 pages.
ZTE, "Remaining Issues of Discovery Transmission", 3GPP TSG RAN WG1 Meeting #79, R1-144835, Nov. 2014, 6 pages.
Alcatel-Lucent, et al., "Discovery Resource selection for Type 1 resource allocation", 3GPP TSG RAN WG1 Meeting #78, R1-143020, Aug. 2014, 5 pages.

* cited by examiner (a)

(b)

(a)

(b)

METHOD AND DEVICE FOR TRANSMITTING AND RECEIVING PLURALITY OF D2D SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2016/003723, filed on Apr. 8, 2016, which claims the benefit of U.S. Provisional Application Nos. 62/144,916, filed on Apr. 8, 2015, 62/150,234, filed on Apr. 20, 2015, 62/174,539, filed on Jun. 12, 2015, and 62/251,088, filed on Nov. 4, 2015, the contents of which are all hereby incorporated by reference herein in their entirety.

TECHNICAL FIELD

The following description relates to a wireless communication system and, more particularly, to a method of, at a device-to-device (D2D) user equipment (UE) or a relay, transmitting and receiving a plurality of control signals/discovery signals in one period, and a device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention is to provide a method of, at a D2D UE or relay, transmitting a plurality of SAs/discoveries (signals) in one SA/discovery period.

The technical problems solved by the present invention are not limited to the above technical problems and other technical problems which are not described herein will become apparent to those skilled in the art from the following description.

Technical Solution

The object of the present invention can be achieved by providing a method of transmitting a discovery signal in a wireless communication system including the method selecting n (n>0) resource units to transmit the discovery signal from a resource pool and transmitting the discovery signal using the selected n resource units, wherein, upon selecting the n resource units, a k-th (0<k=<n) resource unit is selected from subframes excluding subframes including a first resource unit to a (k−1)-th resource unit.

In another aspect of the present invention, provided herein is a user equipment (UE) device for transmitting and receiving a vehicle to everything (V2X) related signal in a wireless communication system including a transmission module and a reception module and a processor, wherein the processor selects n (n>0) resource units to transmit a discovery signal from a resource pool and transmits the discovery signal using the selected n resource units, and wherein, upon selecting the n resource units, a k-th (0<k=<n) resource unit is selected from subframes excluding subframes including a first resource unit to a (k−1)-th resource unit.

The n resource units may be randomly selected.

The resource units may be time-frequency resources of subframe units.

The resource units may be time-frequency resources configured in subframes units on a time axis and configured in resource block units on a frequency axis.

The n resource units may be transmitted through the same antenna port.

Resource units transmitted through different antenna ports among the n resource units may be capable of being present on the same subframe.

n resource pools may be included in one discovery period.

Advantageous Effects

According to the present invention, when a D2D UE or a relay transmits a plurality of SAs/discoveries (signals) in one SA/discovery period, collision can be avoided and a peak-to-average ratio (PAPR) can be reduced.

The effects which can be obtained by the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Figure 1:
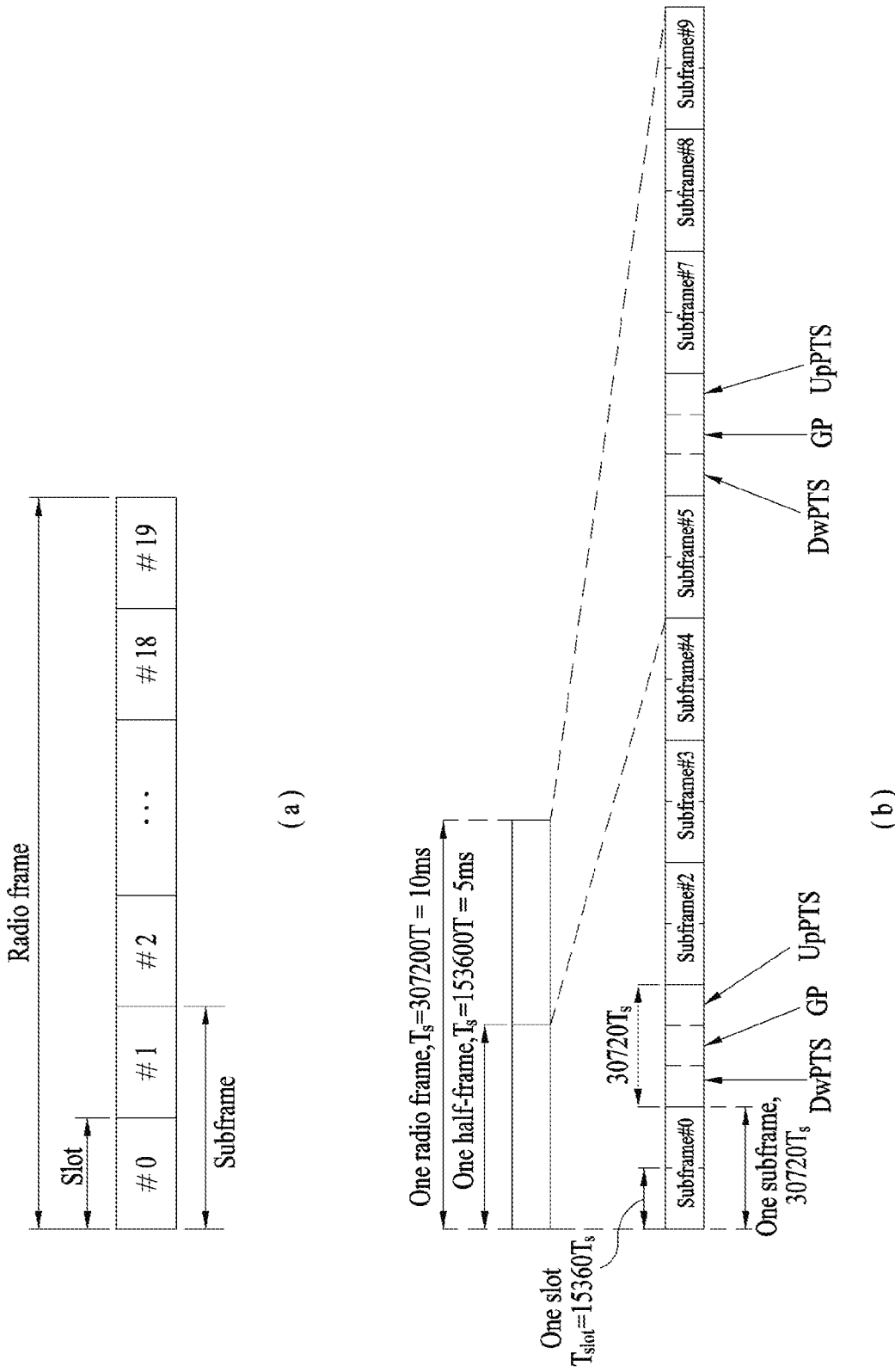
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
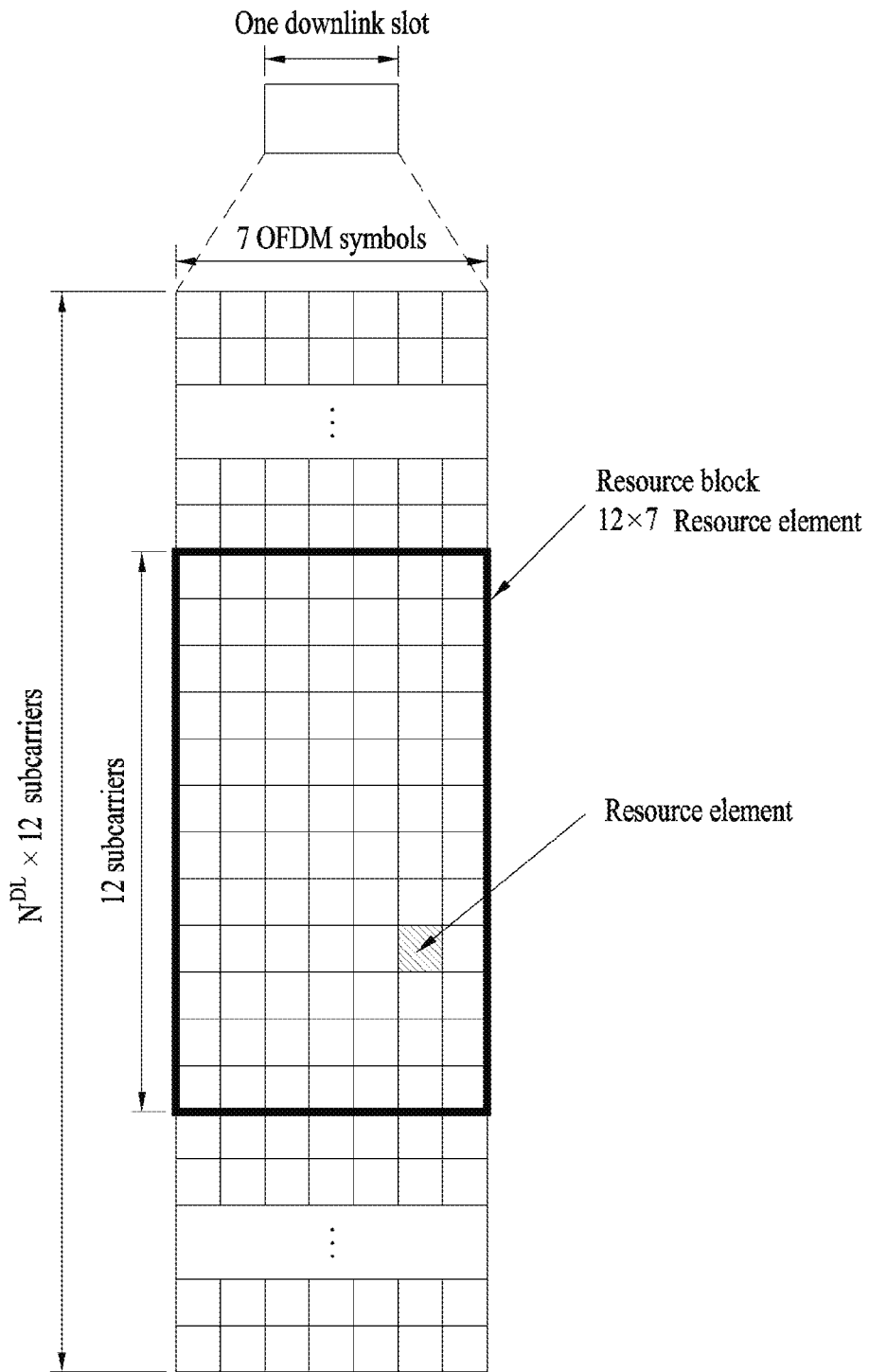
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
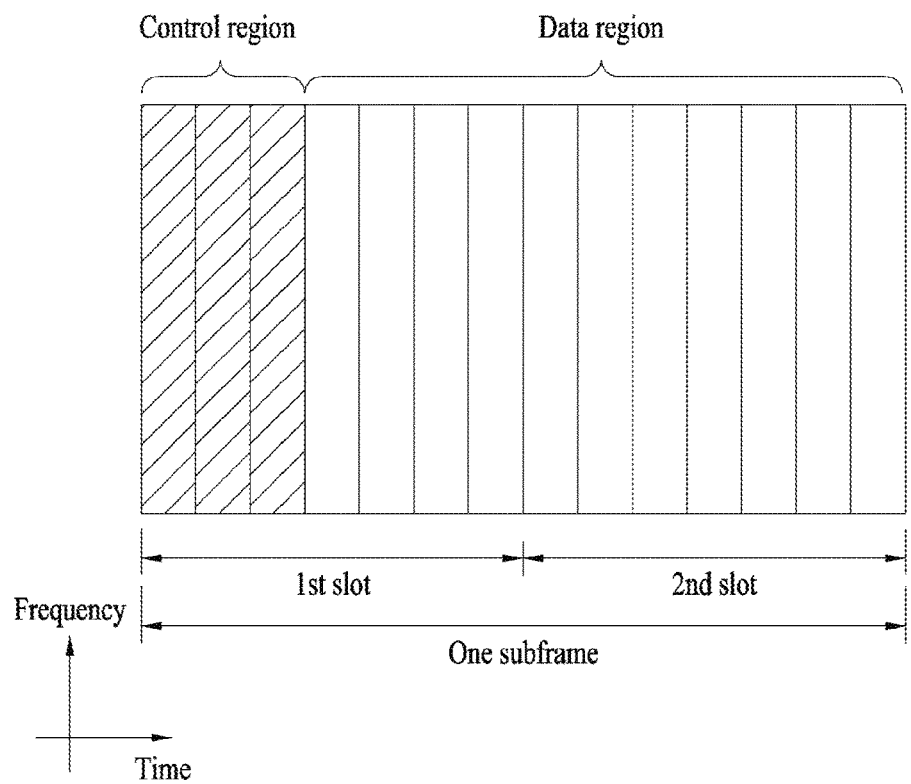
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
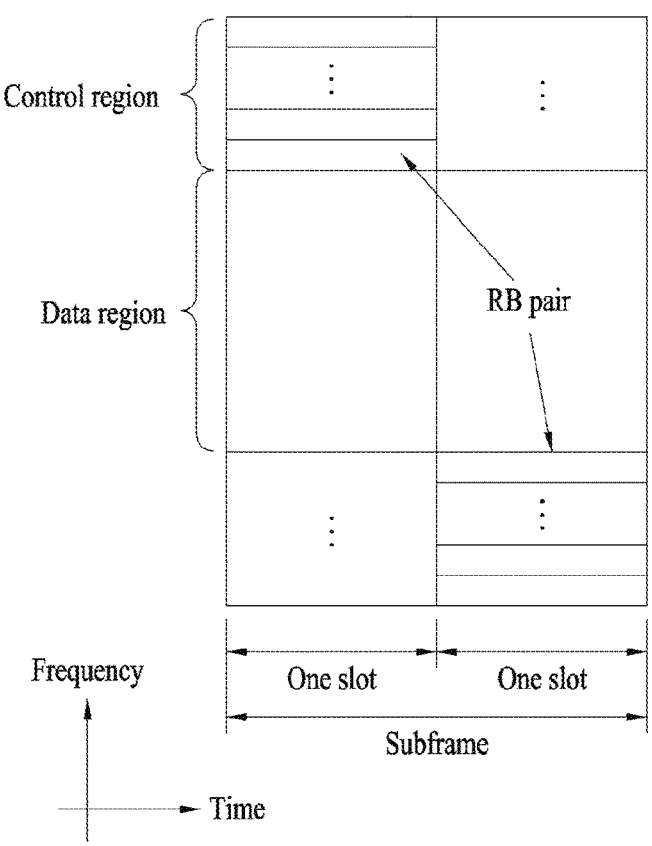
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
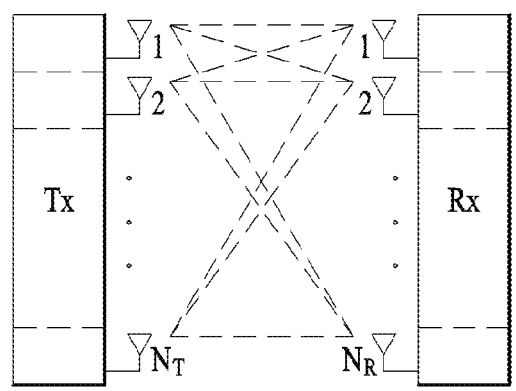
FIG. 5 is a diagram for a configuration of a wireless communication system having multiple antennas.
Figure 5:
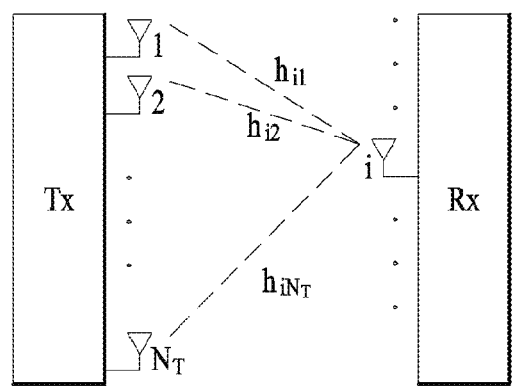

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, X_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T1} & w_{N_T2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$ [Equation 8]

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_T} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\mathrm{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
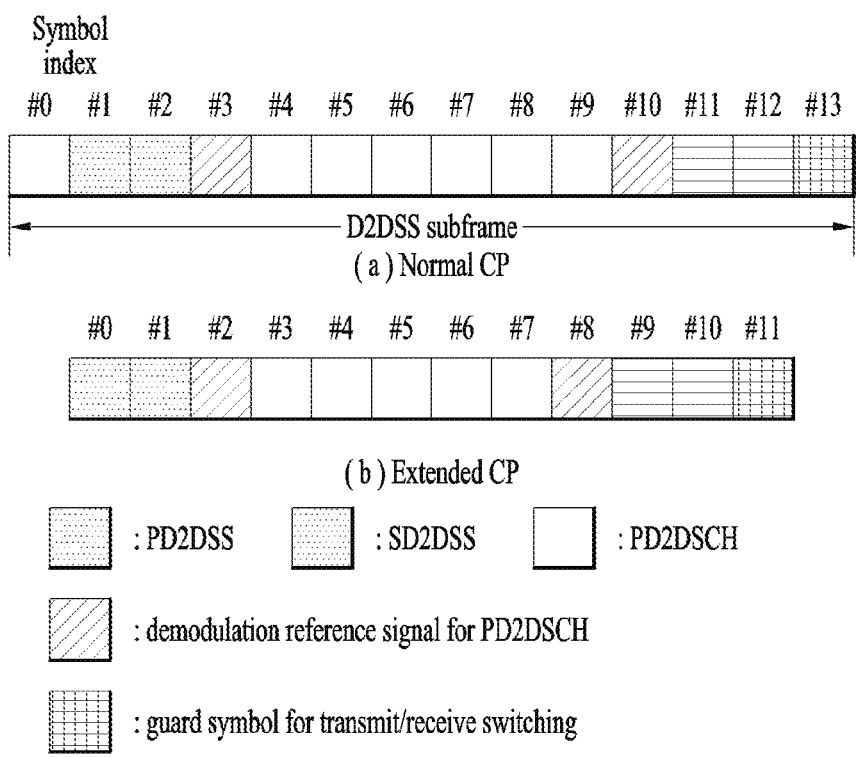
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
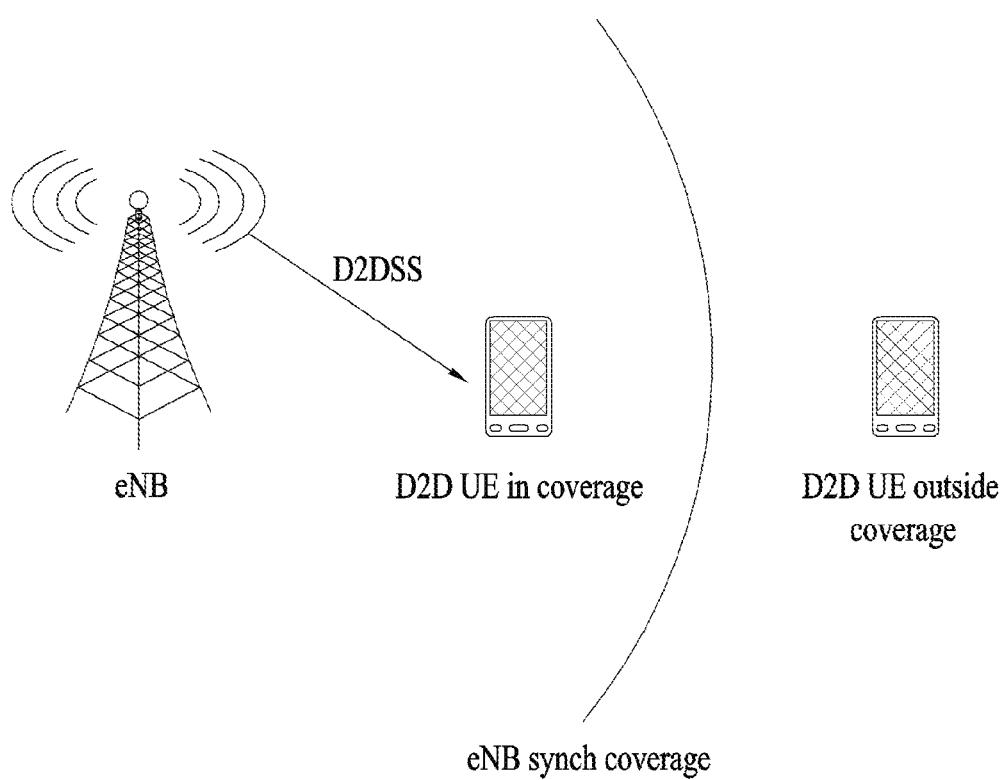
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8:
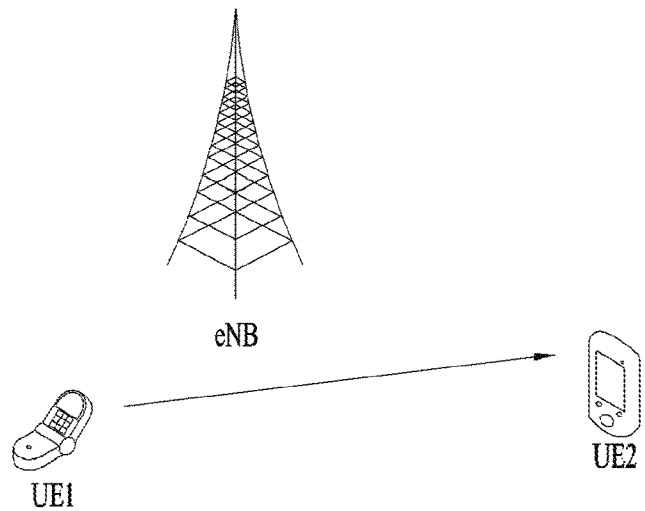
FIG. 8 is a diagram for an example of a D2D resource pool for performing D2D communication.
Figure 8:
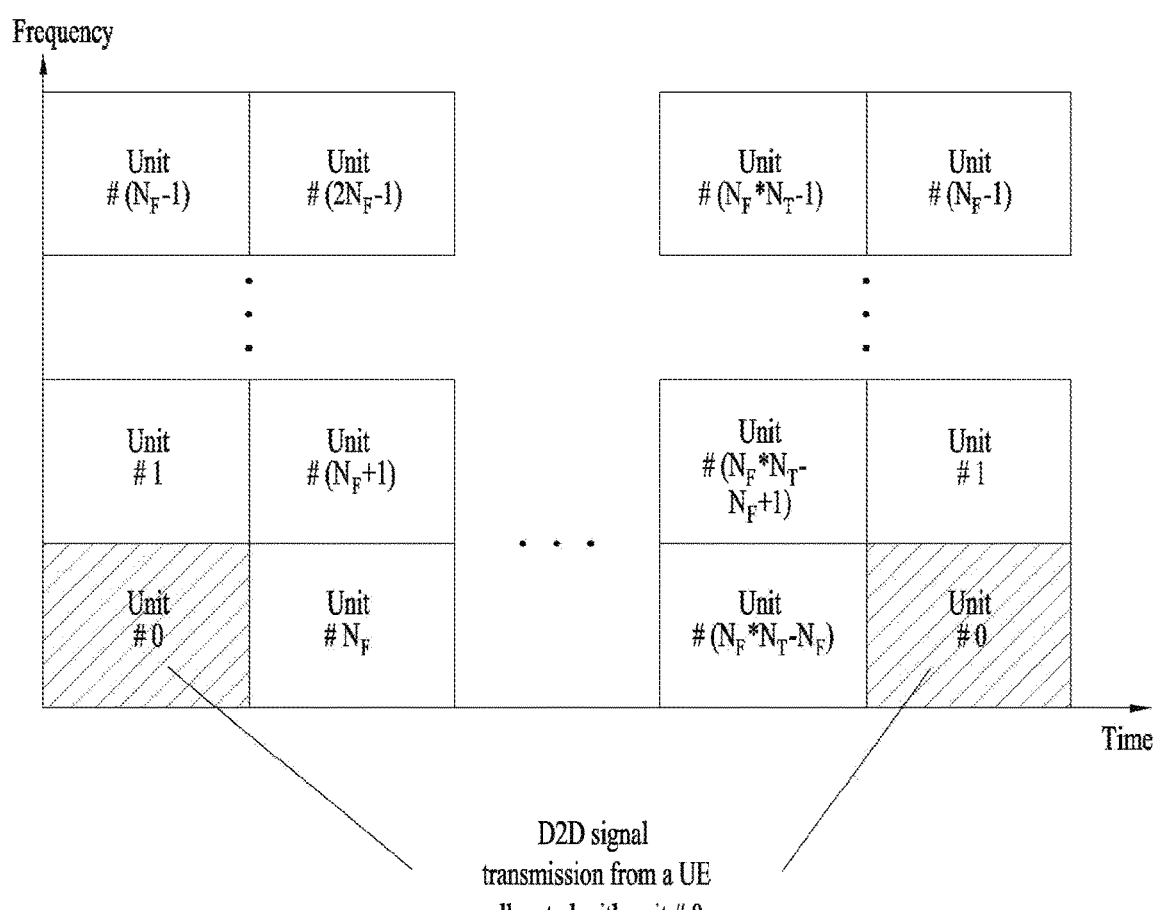

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
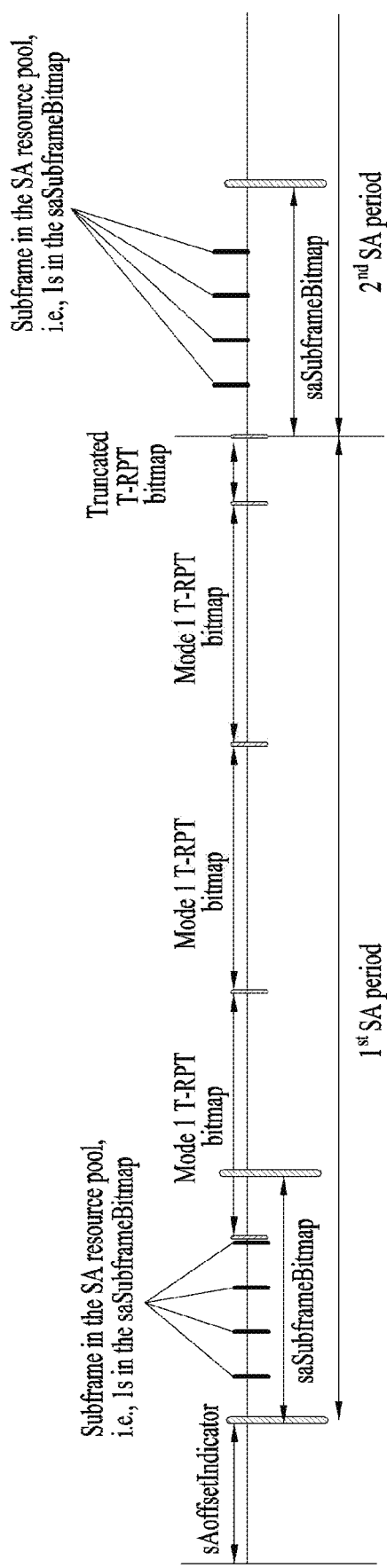
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. SA may indicate the transmission position of data in the form of T-RPT or using another explicit method. For example, a transmission start position of data, a repetition number, etc. may be indicated. More generally, SA is a channel which indicates time and frequency positions of transmission resources of data and includes and transmits supplementary information necessary for data decoding. Such an SA resource pool may be separated from a data pool or may partially overlap a data pool to partially share a data domain. In addition, the data pool and the SA resource pool may not be separated in the time domain but may be separated in the frequency domain.

Hereinafter, various methods of avoiding collision and reducing a PAPR when a D2D UE or a relay transmits a plurality of SAs/discoveries (signals) within one SA/discovery period will be described in detail. In the following description, a D2D UE or a UE may be one of a D2D UE or a relay capable of transmitting or receiving a D2D signal.

Embodiment 1

Figure 10:
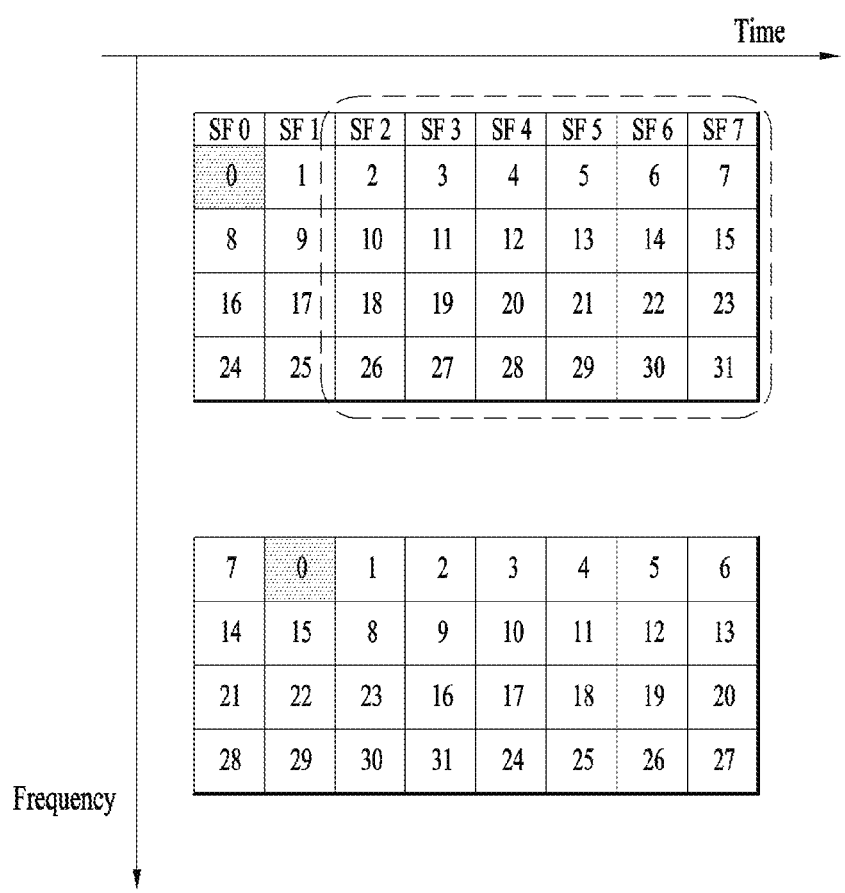
FIGS. 10 to 12 are diagrams illustrating embodiments of the present invention.

The UE according to the embodiment of the present invention may select n (n>0) resource units to transmit discovery signals from a resource pool and transmit the discovery signals using the selected n resource units. Here, upon selecting n resource units, a k-th (0<k=<n) resource unit may be selected from among subframes excluding subframes including a first resource unit to a (k−1)-th resource unit. Alternatively, upon selecting n resource units, the k (0<k=<n) resource unit should be selected from among subframes excluding subframes including a first resource unit to a (k−1)-th resource unit. That is, the UE for transmitting a plurality of discovery signals in one discovery period may sequentially select discovery resources or may not select resources included in subframes in which previously selected discovery resources are transmitted. For example, in FIG. 10, when #0 resource is selected in subframe 0 (SF0), a next resource (#0 resource of subframe 1 as shown in FIG. 10) is selected from among resources of subframes excluding subframe 0. If the number of transmitted discovery signals is 3 or more, resources are selected from among resources excluding subframes in which previously selected resources are included.

While satisfying such conditions, n resource units may be randomly selected. Alternatively, n resource units may be selected with an equal probability.

The resource units may mean time-frequency resources of subframe units. More specifically, the resource units may be time-frequency resources configured in subframe units on a time axis or configured in resource block units on a frequency axis. In addition, n resource pools may be included in one discovery period. That is, the above-described condition for selecting the resource unit (selection from among subframes excluding subframes including the first resource unit to the (k−1)-th resource unit) is applicable upon selecting resources within one discovery period.

In the above description, n resource units may be transmitted through the same antenna port. If n resource units are transmitted through different antenna ports, the above-described condition for selecting the resource units (selection of the k-th (0<k=<n) resource unit from among subframes excluding subframes including the first resource unit to the (k−1)-th resource unit, upon selecting n resource units) may not be applied. That is, if n resource units are transmitted through the same antenna port, the above-described condition for selecting the resource units (selection of the k-th (0<k=<n) resource unit from among subframes excluding subframes including the first resource unit to the (k−1)-th resource unit, upon selecting n resource units) should be applied. Alternatively, the resource units transmitted through different antenna ports among n resource units may be present on the same subframe.

Figure 11:
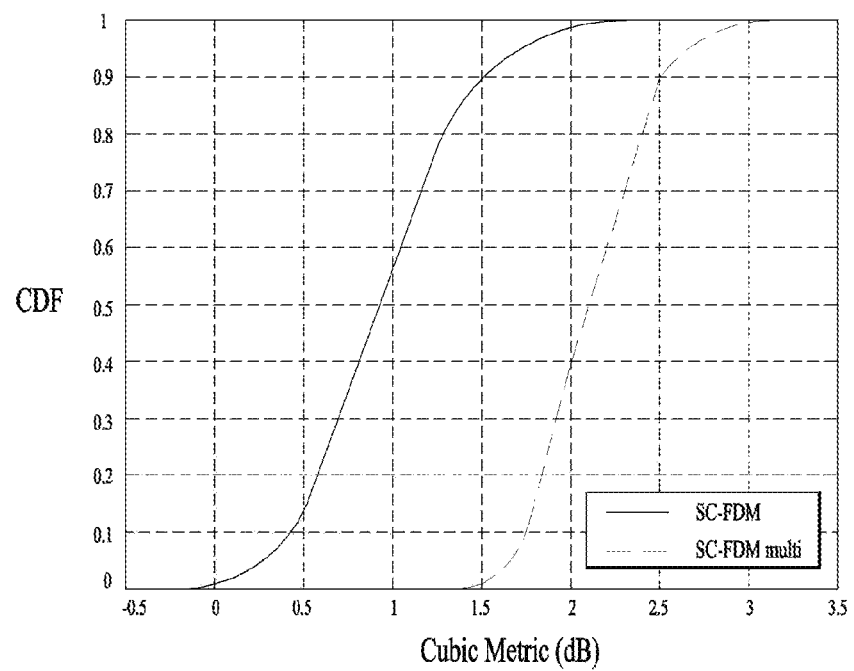

According to the above description, resources for transmitting the discovery signals are separated in the time domain. This is advantageous in terms of a peak-to-average power ratio (PAPR). If discovery signals are transmitted in two or more resource regions separated on the frequency axis in one subframe, single-carrier properties are not satisfied to increase the PAPR. Accordingly, in the present invention, subframes, resources of which are selected for the discovery signals, are excluded upon selecting next resources, thereby improving the PAPR. FIG. 11 shows the effects of the embodiment of the present invention. The simulation result of FIG. 11 is obtained when the discovery signals are transmitted on 2 RBs and QPSK is assumed. In FIG. 11, a solid line denoting SC-FDM indicates a relation between a cumulative density function (CDF) and a cubic metric (CM) when only one resource unit is selected from one subframe as the above-described embodiment of the present invention and a dotted line denoting SC-FDM multi indicates the relation between the CDF and the CM when two resources are selected from one subframe. As shown in the figure, according to the embodiment of the present invention, it can be seen that the cubic metric (CM) is as good as 1 dB or more (when the CDF is 0.5). If the CM is large, all transmit power cannot be used (power backoff should be performed due to CM). Accordingly, when the embodiment of the present invention is used, transmit power can be further used and (discovery) coverage can be prevented from being reduced.

Embodiment 2

The UE may select n (n>0) resource units to transmit SA signals from a resource pool and transmit the SA signals using the selected n resource units. Here, upon selecting n resource units, a k-th (0<k=<n) resource unit may be selected from among subframes excluding subframes including a first resource unit to a (k−1)-th resource unit. Alternatively, upon selecting n resource units, the k-th (0<k=<n) resource unit should be selected from among subframes excluding subframes including a first resource unit to a (k−1)-th resource unit. That is, the UE for transmitting a plurality of SA signals in one SA period may sequentially select SA resources or may not select SA resources included in subframes in which previously selected SA resources are transmitted. That is, after a first SA resource is selected, a second SA resource may be selected from resources excluding SA resources included in nt1, mod(nt1+nf1, Nt) subframes.

Figure 12:
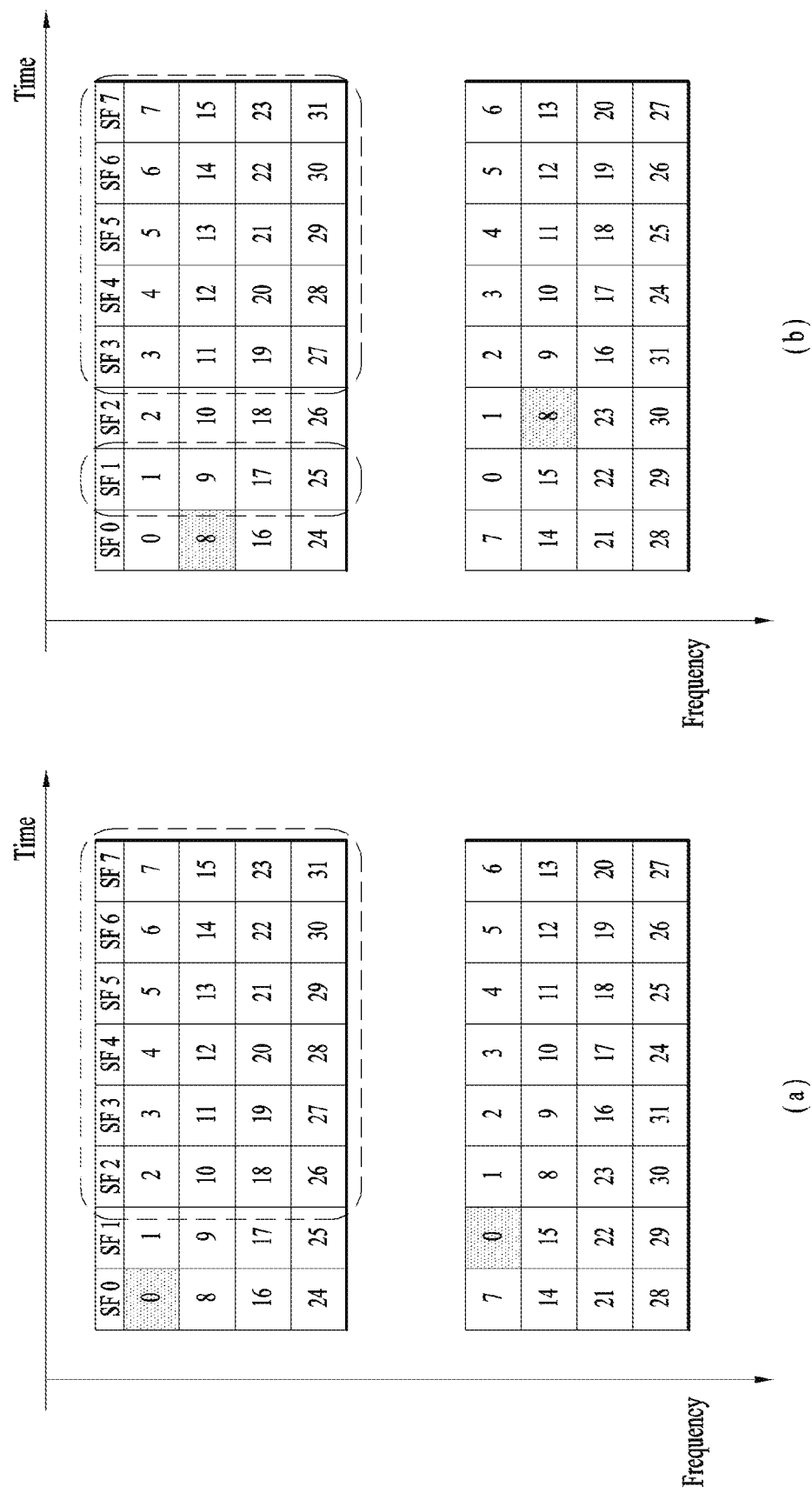

For example, in FIG. 12(a), if #0 resource is selected in subframe 0 (SF0), a next resource (#0 resource of subframe 1 as shown in FIG. 12(a)) is selected from among resources of subframes excluding subframe 0. If the number of transmitted SA signals is 3 or more, resources are selected from among resources excluding subframes in which previously selected resources are included. FIG. 12(b) shows selectable SA resources when a UE, which has selected SA resource #8, selects a next SA resource.

While satisfying such conditions, n resource units may be randomly selected. Alternatively, n resource units may be selected with an equal probability.

The resource units may mean time-frequency resources of subframe units. More specifically, the resource units may be time-frequency resources configured in subframe units on a time axis or configured in resource block units on a frequency axis. In addition, n resource pools may be included in one SA period. That is, the above-described condition for selecting the resource unit (selection from among subframes excluding subframes including the first resource unit to the (k−1)-th resource unit) is applicable upon selecting resources within one SA period.

In the above description, n resource units may be transmitted through the same antenna port. If n resource units are transmitted through different antenna ports, the above-described condition for selecting the resource units (selection of the k (0<k=<n) resource unit from among subframes excluding subframes including the first resource unit to the (k−1)-th resource unit, upon selecting n resource units) may not be applied. That is, if n resource units are transmitted through the same antenna port, the above-described condition for selecting the resource units (selection of the k (0<k=<n) resource unit from among subframes excluding subframes including the first resource unit to the (k−1)-th resource unit, upon selecting n resource units) should be applied. Alternatively, the resource units transmitted through different antenna ports among n resource units may be present on the same subframe.

In selection of the SA resources, resources which do not cause collision in the time domain may be selected to send a D2D grant in D2D mode 1 (a mode in which an eNB directly indicates positions of D2D resources) but a UE may select SA resources in mode 2. Therefore, collision may occur in the time domain. According to the above embodiment, such a problem can be solved.

If an SA pool is narrow on the time axis, resources to be additionally transmitted may be insufficient (for example, when at least four subframes are necessary to transmit two SAs, but an SA pool has less than four subframes). Accordingly, if there is a UE for transmitting several SAs, in order for this UE to receive SAs of other UEs, a network may configure the number of subframes in an SA pool in association with the number of transmitted SAs. For example, if there is a UE for transmitting at least two SAs, a network configures an SA resource pool with at least six subframes. In this case, an SA transmission UE may listen to SAs of other UEs in two different subframes. In contrast, the maximum number of transmitted SAs may be determined according to the number of subframes of one SA pool and a detailed operation thereof will be described below.

Meanwhile, if resource pools are subjected to FDM in operation for transmitting SAs in several pools, SAs separated in the frequency domain may be selected and transmitted in the same subframe in the time domain. In order to prevent such operation, even in different resource pools, SA resources included in subframes selected for SA transmission in another pool may be excluded upon selecting SA resources. This operation is applicable to the case where an SA pool and a data pool are subjected to FDM. If the data pool and SA pools of different resource pools are subjected to FDM, SA resources included in a subframe in which data is transmitted through a previous SA pool may be excluded. This operation may be performed in association with packet priority and a subframe in which data having high priority is transmitted may be excluded and a subframe in which data having low priority is transmitted may be used to select SA resources. Further, in a data pool subjected to FDM with an SA pool having high priority, a rule for prohibiting data transmission may be set.

Further, if there is no SA resource to be selected in the time domain, selection of SA resources in the SA period may be stopped and data transmission associated with the SA may also be stopped. For example, if an SA resource pool is composed of N subframes, the maximum number of SAs is N/2 and a rule for disabling transmission of SAs greater in number than N/2 may be set. If SA transmission is performed in all SA subframes, since data reception may be impossible in the SA period, the maximum number of transmitted SAs may be set to be less than N/2 and the maximum number of transmitted SAs per SA pool may be predetermined or configured by a network.

Embodiment 3

A UE having a plurality of transmit antennas mounted therein may transmit a plurality of SAs/discoveries in one SA/discovery period. The assumption that a UE for transmitting several SAs/discoveries in one SA/discovery period may include a plurality of transmit antennas is possible and the maximum number of transmittable SAs/discoveries may be restricted by the number of antennas. In mode 1/type 2, an eNB may indicate a plurality of SA/discovery resource indices and, at this time, a maximally applicable D2D grant may be restricted by the number of antennas of a transmission UE and an SA/discovery resource index per antenna may be selected by a UE or indicated by an eNB. In mode 2/type 1, an SA/discovery transmission UE may select a plurality of SA/discovery resource indices and transmit SAs/discoveries. At this time, different SA/discovery resource indices are linked according to antenna to generate and transmit separate SC-FDM signals through D2D data and SA/discovery resources determined in the corresponding antenna. In this case, only SA/discovery resource index resources which differ according to antennas may be advantageously selected from an existing SA/discovery resource pool.

Embodiment 4

A UE for transmitting a plurality of SAs/discoveries in one SA/discovery period may transmit SAs/discoveries in a separate resource pool. At this time, in the separate resource pool, only a UE for transmitting a plurality of SAs/discoveries may perform transmission. In this resource pool, a rule for transmitting a separate SA/discovery format (e.g., SA/discovery transmission of 2RB format) may be set. At this time, several SA/discovery contents may be included in the separate SA/discovery format and, for example, several group destination IDs may be included. As another example, a plurality of pieces of frequency resource allocation information, T-RPT, MCS, etc. may be included and transmitted in the separate SA/discovery format. At this time, each SA/discovery content may correspond one-to-one to each group destination ID. Alternatively, all or some of SA/discovery contents may be commonly applied to several group destination IDs. For example, MCS may be commonly applied to several group destinations or a group destination ID may be applied to several groups. The SA/discovery pool configured in the separate format and the SA/discovery pool configured in the existing format may be linked to the same data pool. In other words, the existing data pool may be linked to a plurality of SA/discovery pools and a transmission format may be separately set according to SA/discovery pool. To this end, a network may specify a transmission format per SA/discovery pool and to which data pool the SA/discovery pool is linked, through a higher layer signal. In the case of out-of-coverage, the above information may be predetermined.

Embodiment 5

A plurality of SA/discovery resource pools may be configured and may be linked to one data pool. In other words, one SA/discovery resource pool may be divided into several sub-pools and a current SA/discovery resource hopping method is applicable to each sub-pool. At this time, the sub-pools may be resource pools divided in the time domain. To this end, a network may signal to which data pool an SA/discovery pool is linked. Alternatively, how one SA/discovery pool is divided into sub-pools may be signaled. In the case of out-of-coverage, the above information may be predetermined.

Meanwhile, even in different modes/types, SAs/discoveries may be transmitted. For example, transmission may be allowed in both an SA/discovery pool of mode 1/type 2 and an SA/discovery pool of mode 2/type 1. At this time, in order to prevent a malicious UE from excessively transmitting SAs/discoveries to disable a network, a rule for enabling only a UE having data to be transmitted to transmit a maximum number N of SAs/discoveries may be set. Here, N may be predetermined or configured by a network. Alternatively, the N value may be determined according to the number of resource pools. For example, if the number of resource pools is large, the number N of signals transmitted per pool may be set to be small and, if the number of resource pools is small, the N value may be set to be large. If a large number of pools is configured, the N value is set to be small (e.g., N=1), SA/discovery/data may be transmitted in different pools to perform communication with several groups and, if a small number of pools, that is, one or two pools, is configured, several pieces of SA/discovery data may be allowed to be transmitted in one pool to perform simultaneous communication with several groups. That is, in order for one UE to simultaneously transmit SA/discovery/data to several groups in one SA/discovery period, transmission of SA/discovery/data in several pools is allowed. In particular, this method may be efficiently used when a relay UE communicates with several out-of-coverage UEs. If the number of relay UEs is restricted, one relay UE needs to perform communication with several out-of-coverage UEs and use of different pools in one SA/discovery period is allowed to reduce transmission delay in relay operation. (If only one transmission is allowed in one SA/discovery period, several SA/discovery periods are necessary to communicate with several out-of-coverage UEs, thereby causing delay.)

If a pool for transmission of a relay UE is predetermined and a pool for transmission of a remote UE is predetermined, the number of SAs/discoveries transmittable per pool may be restricted according to the number of pools capable of being used by each UE, predetermined or signaled by a network.

Meanwhile, transmission of SAs/discoveries in different modes may extend to allow transmission of SAs/discoveries in several pools in mode 2/type 1. At this time, although different pools may be used for communication with different UEs/UE groups, if in which cell a UE receives which pool is not accurately determined even in the same group, data may be transmitted in several pools to increase a probability of a destination UE receiving the data. For example, assume that four resource pools are configured, each pool is subjected to TDM, two pools are aligned to timing of a cell 1 and two pools are aligned to timing of a cell 2. At this time, if timing selected by a remote UE is not checked, a relay UE may transmit SA/discovery/data in respective pools linked to different cells.

Meanwhile, in the above method, when several SA/discovery pools are linked to one data pool, a UE capable of performing transmission in each SA/discovery pool may be predetermined like a relation between a relay UE and a remote UE or may be determined according to priority of a packet transmitted by a UE or group priority. For example, a rule for enabling only a UE having predetermined priority or higher to perform transmission in a specific SA/discovery pool (or a sub-pool) may be determined.

Embodiment 6

In D2D discovery signal transmission, if retransmission is allowed in one period, a UE may perform transmission in consecutive subframes. If one SA/discovery resource pool is composed of Nt subframes and the number of transmitted SAs/discoveries is 2, two subframes are combined to configure one logical SA/discovery subframe and different SAs/discoveries may be transmitted in each logical SA/discovery subframe. At this time, frequency hopping for different SA/discovery messages may be configured by a network or frequency hopping may be applied according to a predetermined pattern (Nf/2).

Embodiment 7

A method of randomly selecting a plurality of SA/discovery resources from an SA/discovery pool and randomly selecting different SA/discovery resources is proposed. In this case, different SA/discovery resources are selected, thereby preventing the same SA/discovery resources from being selected in order to transmit different SA/discovery contents. A UE for transmitting a plurality of SAs/discoveries in one SA/discovery period may sequentially select SA/discovery resources. A first SA/discovery resource is randomly selected and subsequent SA/discovery resources are randomly selected excluding the previously selected SA/discovery resources. Meanwhile, although the above-described method is applied, when the plurality of SA/discovery resources is selected in one subframe, SAs/discoveries may be randomly selected and transmitted or an SA/discovery having high priority may be preferentially selected according to the priority of the SA/discovery signal (here, the priority may be predetermined in a UE (destination) group-specific, UE-specific or packet-specific (e.g. in the case of preferentially transmitting a packet as compared to the other D2D packets like MCPTT preemption) manner. As another implementation, a rule for enabling a UE for transmitting a plurality of SAs/discoveries in one SA/discovery period to randomly select a plurality of SA/discovery resources and to reselect an SA/discovery resource if the same resource is selected (or if the same SA/discovery resource index is selected) and repeating this process until all SAs/discoveries select different resource indices may be determined.

If an SA/discovery resource transmitted in a subframe, such as a previously selected SA/discovery resource, is selected, the resource is excluded and reselection operation is performed. Meanwhile, in operation for performing the process of reselecting the SA/discovery resource again, a maximum reselection number may be restricted to a specific number N. If the SA/discovery resources divided in the time domain cannot be selected even when reselection is performed by the maximum reselection number, a rule for dropping data transmission in the SA/discovery period may be set.

Embodiment 8

When a plurality of SA/discovery resources is selected from an SA/discovery pool, if the same SA/discovery resource is selected or if several SAs/discoveries are transmitted in the same subframe, an SA/discovery may be dropped according to the priority of the SA/discovery (here, the priority may be predetermined in a UE (destination) group-specific, UE-specific or packet-specific (e.g. in the case of preferentially transmitting a packet as compared to the other D2D packets like MCPTT preemption) manner (an SA/discovery having low priority may be dropped first) or may be randomly dropped if the priority is equal. In this method, this SA/discovery resource selection method is similar to a conventional method, but a prioritization rule is defined when a UE for transmitting a plurality of SAs/discoveries selects overlapping resources, thereby minimizing additional UE implementation.

Meanwhile, if SAs/discoveries having different formats are transmitted in one SA/discovery pool, all or some of a DMRS CS, CRC masking or a DMRS base sequence ID (e.g., 511 is used for a different SA/discovery format) may be differently set in order to distinguish between the SAs/discoveries. For example, if an SA/discovery to be transmitted by a relay UE and an SA/discovery to be transmitted by a remote UE are transmitted in one SA/discovery pool, CRC masking may be differently set in order to distinguish between the SAs/discoveries. At this time, if one UE transmits SAs/discoveries having different purposes in the same SA/discovery pool, one of the above-proposed methods may be used to prevent the two SAs/discoveries from colliding in the time domain.

Meanwhile, the remote UE, which has decoded the SA/discovery transmitted by the relay UE for transmission of the remote UE, may not perform transmission of some of the data pool in order to ensure an SA/discovery decoding and data encoding time after receiving the SA/discovery. To this end, a rule for disabling transmission during N subframes after receiving the SA/discovery may be set. Here, N may be determined from subframes after receiving SAs/discoveries for the remote UE or a start subframe of the data pool.

Embodiment 9

When a transmission UE transmits a plurality of SAs/discoveries, T-RPT may be differently set in transmission of the data corresponding to each SA/discovery. At this time, T-RPTs, the positions of 1 of the bitmap of which are different, may be selected. For example, T-RPT=[11110000] used by data indicated by SA/discovery 1 and T-RPT=[00001111] used by data indicated by SA/discovery 2 may be set.

Embodiment 10

In Embodiment 9, when the K value (of the data T-RPT) is large, the number of transmittable SAs/discoveries may be restricted or the number of T-RPTs may be restricted. In addition, if the K value is large, there may be no selectable T-RPT. Alternatively, the type of the selectable K value may be restricted. In order to solve this problem, a method of selecting the K value, in which the number of Is, the positions of which are the same, is equal to or less than L, is proposed (e.g., T-RPT=[11110000] used by data of SA/discovery 1 and T-RPT=[0011XXXX] used by data of SA/discovery 2). Here, the L value may be determined according to the K value and/or the number of SAs/discoveries transmitted in one period. For example, L=2 for K=4, L=0 for K=1, 2.

In this method, T-RPTs may overlap in the same subframe. At this time, in order to maintain a single carrier property, only one D2D packet should be selected and transmitted. To this end, a dropping rule or priority should be determined.

As a selection method, i) a method of randomly selecting one packet is proposed. If a plurality of D2D packets is transmitted in the same subframe, one packet is randomly selected and transmitted. ii) If a plurality of D2D packets is transmitted in the same subframe, a prioritization rule of an RV index may be determined. For example, RV0 is transmitted with higher priority, because RV0 has more systematic bits than the other RVs and thus decoding thereof may be important. If different D2D packets of RV0 and RVs (RV 2, 3, 1) are transmitted in the same subframe, RV0 is preferentially transmitted. iii) The above method may extend such that the priority of the RV may be determined in order of RV0, RV2, RV3 and RV1, in order to give priority according to RV transmission order such that a UE, which has received fewer packets, receives more packets. In the proposed method ii) or iii), if the RV orders are the same, the packet may be randomly selected using i).

Since RV0 has more systematic bits than the other RVs, only RV0 may be transmitted with higher priority than the other RVs. Alternatively, priority may be given according to packet size or MCS. For example, a packet having low MCS may be preferentially transmitted, because the packet having low MCS may have a higher degree of importance or emergency in order to secure wider coverage or when a channel state is bad. Similarly, a packet having a small size may be preferentially transmitted. If a small packet is set in order to secure wider coverage, the small packet may be regarded as having higher priority and may be preferentially transmitted. A method of determining priority using the packet size or MCS may be determined prior to the method of using the RV or may be applied only when the RV is the same.

Priority may be determined according to the k value of the T-RPT. For example, if k is differently selected according to SA/discovery, a packet having low k may be preferentially transmitted.

If one UE transmits a signal to several groups and priority is given to each group, a dropping rule may be determined according to priority. For example, if two packets are transmitted to different groups in one SA/discovery period, the priority of a group A is higher than that of a group B and the two packets are simultaneously transmitted in a specific subframe, the signal of the group A is preferentially transmitted. As another example, if a relay packet and a D2D packet are simultaneously transmitted in a specific subframe in a state in which a relay UE relays packets of a network while performing D2D communication with another group, the relayed packet may be preferentially transmitted.

If the RV, packet size, MCS, k, and group priority are all the same, a random selection method may be used.

Embodiment 11

In the above-proposed method, a UE for transmitting several SAs/discoveries in one SA/discovery period may determine the K value per data according to the number of SAs/discoveries. For example, a UE for transmitting two SAs/discoveries in one SA/discovery period may set a maximum K value per SA/discovery to 4. As another example, a UE for transmitting four SAs/discoveries in one SA/discovery period may set a maximum K value per SA/discovery to 1 or 2. If the K value is set to 2 and Embodiment 9 is used, the UE performs transmission in all D2D subframes and thus cannot listen to the D2D signals of the other UEs. Accordingly, at this time, in order to listen to the D2D signals of the other UEs, the K value per SA/discovery may be set to 1.

Table 1 below shows an embodiment of the K value according to the number of SAs/discoveries transmitted in one SA/discovery period in the case of FDD (N=8).

TABLE 1

| K | # of SAs/discoveries |
|---|---|
| 2 or 4 | 2 |
| 2 or 3 or 4 | 3 |
| 1 or 2 | 4 |

In the above example, if K*# of SAs/discoveries exceeds N, overlapping may be allowed using Embodiment 10. If overlapping is allowed, a degree of freedom of selection of T-RPT may be increased and the number of dropped packets may be increased.

Meanwhile, one UE transmits several SAs/discoveries to several destination UEs in one SA/discovery period in order for one transmission UE to deliver messages of several UEs. Even in V2X communication, such a situation may occur. For example, fixed nodes such as roadside units (RSUs) may receive signals from several neighboring UEs and transmit the signals to other vehicle UEs. At this time, when one RSU divisionally transmits the signals of several UEs in the time domain, the signals of the other UEs may not be received due to half duplex constraint, thereby decreasing efficiency. Accordingly, such an RSU may combine V2X messages of several UEs to generate one large message and transmit the message in the time domain for a short time. In particular, if the RSU collects and transmits the messages of the vehicle UEs to pedestrian UEs (P-UEs) for a short time, the waking times of the P-UEs can be reduced and battery consumption of the P-UEs can be reduced. Accordingly, for such operation, a method of, at a specific UE (e.g., RSU), collecting messages from the other UEs to generate a large message and generating and transmitting one MAC PDU is proposed. In order for the other reception UEs to check such operation, a method of adjusting or determining whether such operation is performed, how many messages are combined to configure one message, the size of the small message when several messages are combined to generate one large message, or the size of the resource (RB size and retransmission number) generated when several messages are combined to generate one large message at a network or in consideration of the peripheral state (interference, channel state, etc.) of the terminal is proposed. The non-signaled parameters may be predetermined. If a UE collects several messages and generates and transmits a large message, in order for a reception UE to check such operation, some fields of the SA/discovery may be used to indicate such operation. At this time, whether such operation is performed may be indicated or how many messages are combined to generate one message may be signaled through SA/discovery. In addition, if several messages are combined to generate and transmit a large message, a data pool for transmitting only such a type of message may be separately configured and may have higher priority than periodic messages transmitted by the other vehicle UEs.

When an RSU collects several vehicle messages and generates and transmits a large message, if this message is a unicast message forwarded to another vehicle UE, the ID of a reception UE may be included and transmitted in a physical layer field or a higher layer field of each message. In addition, the size information of each message may be included and transmitted in a specific region of the message. In addition, the UEs, the messages of which are combined to generate a large message, may be indicated through SA/discovery and, to this end, the IDs of several UEs may be included and transmitted in SA/discovery. In this case, since the IDs of the several UEs are included in SA/discovery, a new SA/discovery format may be defined and an SA/discovery pool in which such an SA/discovery format is transmitted may be separately configured.

The examples of the above-proposed methods may be included in one of the implementation methods of the present invention and may be regarded as proposed methods. In addition, the above-proposed methods may be independently implemented and some of the above-proposed methods may be combined (merged). A rule may be defined such that an eNB signals information regarding whether the proposed methods are applied (information regarding the rules of the above-proposed methods) to a UE through a predefined signal (e.g., a physical layer signal or a higher layer signal).

Configuration of Device According to Embodiment of the Present Invention

Figure 13:
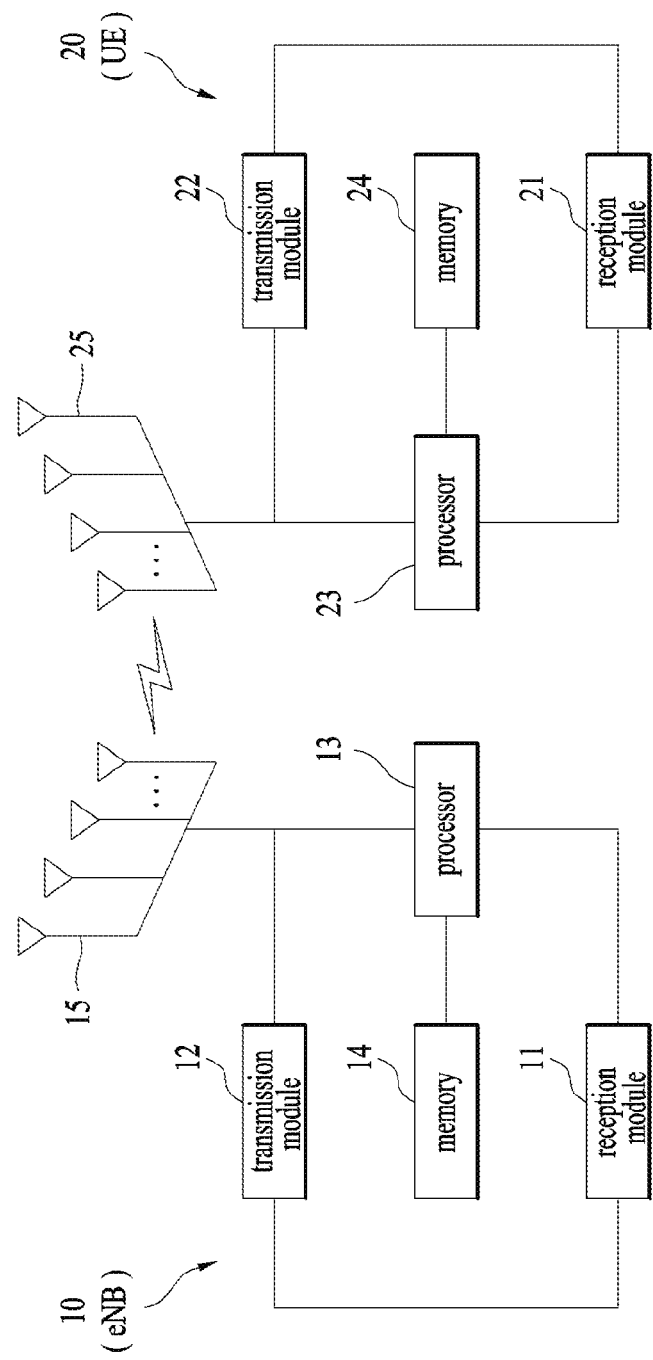
FIG. 13 is a diagram showing the configuration of a transmission and reception device.

FIG. 13 is a diagram showing the configuration of a transmission point device and a UE device.

Referring to FIG. 13, the transmission point device 10 according to the present invention may include a reception module 11, a transmission module 12, a processor 13, a memory 14 and a plurality of antennas 15. Since the plurality of antennas 15 is used, the transmission point device may support MIMO transmission/reception. The reception module 11 may receive a variety of signals, data and information from the UE on uplink. The transmission module 12 may transmit a variety of signals, data and information to the UE on downlink. The processor 13 may control the overall operation of the transmission point device 10.

The processor 13 of the transmission point device 10 according to one embodiment of the present invention may process operations necessary for the above-described embodiments.

The processor 13 of the transmission point device 10 may process information received by the transmission point device 10 and information to be transmitted to an external device and the memory 14 may store the processed information for a predetermined time and may be replaced by a component such as a buffer (not shown).

Referring to FIG. 13, the UE device 20 according to the present invention may include a reception module 21, a transmission module 22, a processor 23, a memory 24 and a plurality of antennas 25. Since the plurality of antennas 25 is used, the UE device may support MIMO transmission/reception. The reception module 25 may receive a variety of signals, data and information from the eNB on downlink. The transmission module 22 may transmit a variety of signals, data and information to the eNB on uplink. The processor 23 may control the overall operation of the UE device 20.

The processor 23 of the UE device 20 according to one embodiment of the present invention may process operations necessary for the above-described embodiments.

The processor 23 of the UE device 20 may process information received by the UE device 20 and information to be transmitted to an external device and the memory 24 may store the processed information for a predetermined time and may be replaced by a component such as a buffer (not shown).

In the above-described detailed configuration of the transmission point device and the UE device, details of the above-described various embodiments of the present invention may be independently applied or 2 or more embodiments may be applied at the same time. In this case, overlapping details will be omitted from the description for simplicity and clarity.

Furthermore, in the description of FIG. 13, the description of the transmission point device 10 may also be equally applied to a device functioning as a downlink transmitter or an uplink receiver. The description of the UE device 20 may also be equally applied to a relay station device functioning as an uplink transmitter or a downlink receiver.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method of transmitting a sidelink signal in a wireless communication system, the method comprising:
    selecting n (n>0) resource units, within a predetermined period of the sidelink signal, to transmit the sidelink signal from a resource pool; and
    transmitting the sidelink signal using the selected n resource units,
    wherein the n resource units are randomly selected within subframes excluding a specific subframe among subframes included in the resource pool, and
    wherein the specific subframe is at least one subframe including resource units already selected for transmission of at least one sidelink signal different from the sidelink signal within the predetermined period.

2. The method according to claim 1, wherein the N resource units are time-frequency resources of subframe units.

3. The method according to claim 1, wherein the N resource units are time-frequency resources configured in subframes units on a time axis and configured in resource block units on a frequency axis.

4. The method according to claim 1, wherein the sidelink signal corresponds to a discovery signal.

5. The method according to claim 4, wherein n resource pools are included in one discovery period.

6. The method according to claim 1, wherein resource units transmitted through different antenna ports among the n resource units are capable of being present on a same subframe.

7. A user equipment (UE) device for transmitting and receiving a sidelink signal in a wireless communication system, the UE device comprising:
    a transmission module and a reception module; and
    a processor,
    wherein the processor selects n (n>0) resource units, within a predetermined period of the sidelink signal, to transmit the sidelink signal from a resource pool and transmits the sidelink signal using the selected n resource units, and
    wherein the n resource units are randomly selected within subframes excluding a specific subframe among subframes included in the resource pool, and
    wherein the specific subframe is at least one subframe including resource units already selected for transmission of at least one sidelink signal different from the sidelink signal within the predetermined period.

8. The UE device according to claim 7, wherein the N resource units are time-frequency resources of subframe units.

9. The UE device according to claim 7, wherein the N resource units are time-frequency resources configured in subframes units on a time axis and configured in resource block units on a frequency axis.

10. The UE device according to claim 7, wherein the sidelink signal corresponds to a discovery signal.

11. The UE device according to claim 7, wherein resource units transmitted through different antenna ports among the n resource units are capable of being present on a same subframe.

12. The UE device according to claim 7, wherein n resource pools are included in one discovery period.

* * * * *